(12) United States Patent
Kreichauf

(10) Patent No.: US 6,428,680 B1
(45) Date of Patent: Aug. 6, 2002

(54) METHOD OF PROVIDING SAFE HAVEN WITHIN BUILDINGS DURING CHEMICAL OR BIOLOGICAL ATTACK

(75) Inventor: Ruth D. Kreichauf, River Falls, WI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/360,036

(22) Filed: Jul. 23, 1999

(51) Int. Cl.[7] .................................................. C25C 1/02
(52) U.S. Cl. ........................ 205/628; 205/633; 454/257; 454/902
(58) Field of Search ................................ 205/628, 633; 454/257, 902

(56) References Cited

U.S. PATENT DOCUMENTS

| | | |
|---|---|---|
| 3,715,131 A | 2/1973 | Hurley et al. |
| 3,730,998 A | 5/1973 | Schmidt et al. |
| 3,741,585 A | 6/1973 | Hendrickson et al. |
| 3,904,221 A | 9/1975 | Shiki et al. |
| 3,920,803 A | 11/1975 | Boryta |
| 3,985,076 A | 10/1976 | Schneiter et al. |
| 4,005,876 A | 2/1977 | Jorgensen et al. |
| 4,020,477 A | 4/1977 | Holland |
| 4,095,211 A | 6/1978 | Shaughnessy |
| 4,096,639 A | 6/1978 | Sandrock |
| 4,232,184 A | 11/1980 | Faust |
| 4,232,308 A | 11/1980 | Lee et al. |
| 4,238,464 A | 12/1980 | Gustafson |
| 4,315,361 A | 2/1982 | Brooks |
| 4,409,978 A | 10/1983 | Bartos |
| 4,490,272 A | 12/1984 | Malafosse et al. |
| 4,508,700 A | 4/1985 | Hoshiko |
| 4,511,887 A | 4/1985 | Fiore |
| 4,519,177 A | 5/1985 | Russel |
| 4,522,116 A | 6/1985 | Tartaglino |
| 4,523,184 A | 6/1985 | Abel |
| 4,530,744 A * | 7/1985 | Smith ......................... 205/338 |
| 4,575,712 A | 3/1986 | Winick |
| 4,631,872 A * | 12/1986 | Daroga ............................ 52/1 |
| 4,662,269 A | 5/1987 | Tartaglino |
| 4,817,828 A | 4/1989 | Goetz |
| 4,877,506 A | 10/1989 | Fee et al. |
| 4,901,715 A | 2/1990 | Mulcahy |
| 5,234,374 A | 8/1993 | Hyzyk et al. |
| 5,253,901 A | 10/1993 | Hunter |
| 5,338,516 A | 8/1994 | Zhang et al. |
| 5,399,121 A | 3/1995 | Gray et al. |
| 5,660,212 A | 8/1997 | Elder |
| 5,741,014 A | 4/1998 | Wambeke et al. |
| 5,761,206 A | 6/1998 | Kackman |
| 5,809,013 A | 9/1998 | Kackman |
| 5,828,300 A | 10/1998 | Addy et al. |

FOREIGN PATENT DOCUMENTS

GB     2121950 A     1/1984

OTHER PUBLICATIONS

Dorcas Co., Ltd., Home Page, Dr. Oxygen, 6 sheets, dated Jun. 22, 1999 at dr-oxygen.com.
World Trade Search Listing for Hoshiko, Inc. and Hoshiko, Inc, web site for Genox, 5 sheets, dated Jun. 22, 1999 at hoshiko.com.

* cited by examiner

Primary Examiner—Kathryn Gorgos
Assistant Examiner—Wesley A. Nicolas
(74) Attorney, Agent, or Firm—John G. Shudy, Jr.

(57) ABSTRACT

A room in a building serving as a safe haven for human inhabitants against harmful agent attack such as chemical or biological weapon attack. The room provides an environment sealed from air-carried harmful agents wherein the sealing can be accomplished by blocking air ducts and air leakage around doors. The room can be specially built, retrofitted, or rapidly adapted to serve as a safe haven. The room can include an oxygen source such as an oxygen generator. One oxygen generator utilizes a chemical process to generate gaseous oxygen. The room preferably includes a carbon dioxide scrubber. The invention includes kits and methods for rapidly converting a room to a safe haven.

18 Claims, 2 Drawing Sheets

METHOD OF PROVIDING SAFE HAVEN WITHIN BUILDINGS DURING CHEMICAL OR BIOLOGICAL ATTACK

RELATED APPLICATIONS

The present invention is related to U.S. patent application Ser. No. 09/281,738. Filed Mar. 30, 1999, entitled METHOD AND APPARATUS FOR SEALING BUILDING DUCTWORK DURING CHEMICAL OR BIOLOGICAL ATTACK, now U.S. Pat. No. 6,217,441.

FIELD OF THE INVENTION

The present invention is related generally to building heating, ventilating, and air conditioning. More specifically, the present invention is related to methods and devices for providing a room environment within a building capable of sustaining human life during a chemical or biological attack.

BACKGROUND OF THE INVENTION

The recent demise of the cold war and decline in superpower tensions has been accompanied by an increase in concern over the viability of weapons of mass destruction such as chemical and biological (CB) weapons. CB weapons include chemical agents such as phosgene, nerve agents such as Sarin, and biological agents such as anthrax or small pox. CB weapons may be delivered to occupants within a building by releasing the agents external to the building but close to an air intake of the building. The air intake may be located near the ground or near the roof or somewhere in between, depending on the building architecture. Agents may also be released within a public area of a building and be dispersed to other, private areas of the same building. Agents released in one area of a building may be further dispersed by the heating, ventilating, and air conditioning (HVAC) system of the building. It is possible that building air may be removed from the room of release and dispersed by the HVAC system itself through the building. If building air is recycled by mixing return air with intake air, as is sometimes the case, either intentionally or inadvertently, then the HVAC system may effectively deliver an agent from one room to another or even to the entire building.

Agents may be delivered in vehicles giving some warnings as to the delivery, such as missiles. Agents may be delivered in vehicles giving no warning, such as a pedestrian held putative asthma inhaler activated near an air intake. Certain buildings, such as key military sites, can be equipped or designed well in advance to deal with the use of CB weapons. Some buildings may be partially protectable given sufficient lead time. Other buildings, however, such as hotels that are hosting dignitaries or a head of state may be more susceptible to a CB weapons attack.

What would be desirable is a room in a building capable of serving as a safe haven from CB attack for a limited period of time. What would also be desirable are devices and methods for rapidly converting an existing room in even a public building into a safe haven on very short notice.

SUMMARY OF THE INVENTION

The present invention includes a room in a building capable of sustain human life for a limited time in the face of a chemical or biological attack or other type of catastrophic situation (e.g., tornadoes) that require evacuation to one room. The room is preferably sealed off from ventilation air supply and return ducts and vents. The door is preferably sealed around the edges. In one embodiment, the room is originally and specially built to serve as a safe haven from chemical and biological attack. In another embodiment, a room is retrofitted to serve as a safe haven. In yet another embodiment, a room is rapidly sealed and adapted to serve as a safe haven.

The room can include an oxygen source capable of providing gaseous oxygen to the inhabitant or inhabitants. One embodiment includes compressed oxygen in a cylinder as the source. Another embodiment includes a chemical oxygen generator utilizing the decomposition of a chemical solid. Yet another embodiment utilizes a granular chemical solid which generates oxygen when added to water and preferably operates in conjunction with a second, rate controlling chemical such as a catalyst. Other oxygen sources which can be used in various ways include pressure swing absorption units and electrolytic units. Some oxygen sources require venting to the outside, with the venting specially pre-built in some embodiments and added quickly through a water trap in other embodiments.

The invention also includes a carbon dioxide scrubber to remove gaseous carbon dioxide from the room atmosphere. One embodiment of the scrubber includes a chemical compound capable of adsorbing or otherwise fixing or binding the gaseous carbon dioxide. The scrubber can include a fan to improve the efficiency of the scrubber. Some embodiments include a chemical air revitalizer capable of both absorbing carbon dioxide and generating oxygen.

The invention includes devices for sealing the room from air supply and return ducts. These devices include inflatable bladders for insertion into air ducts and quickly curing chemical foam generators for blockage of air vents and ducts.

DETAILED DESCRIPTION OF THE INVENTION

Figure 1:
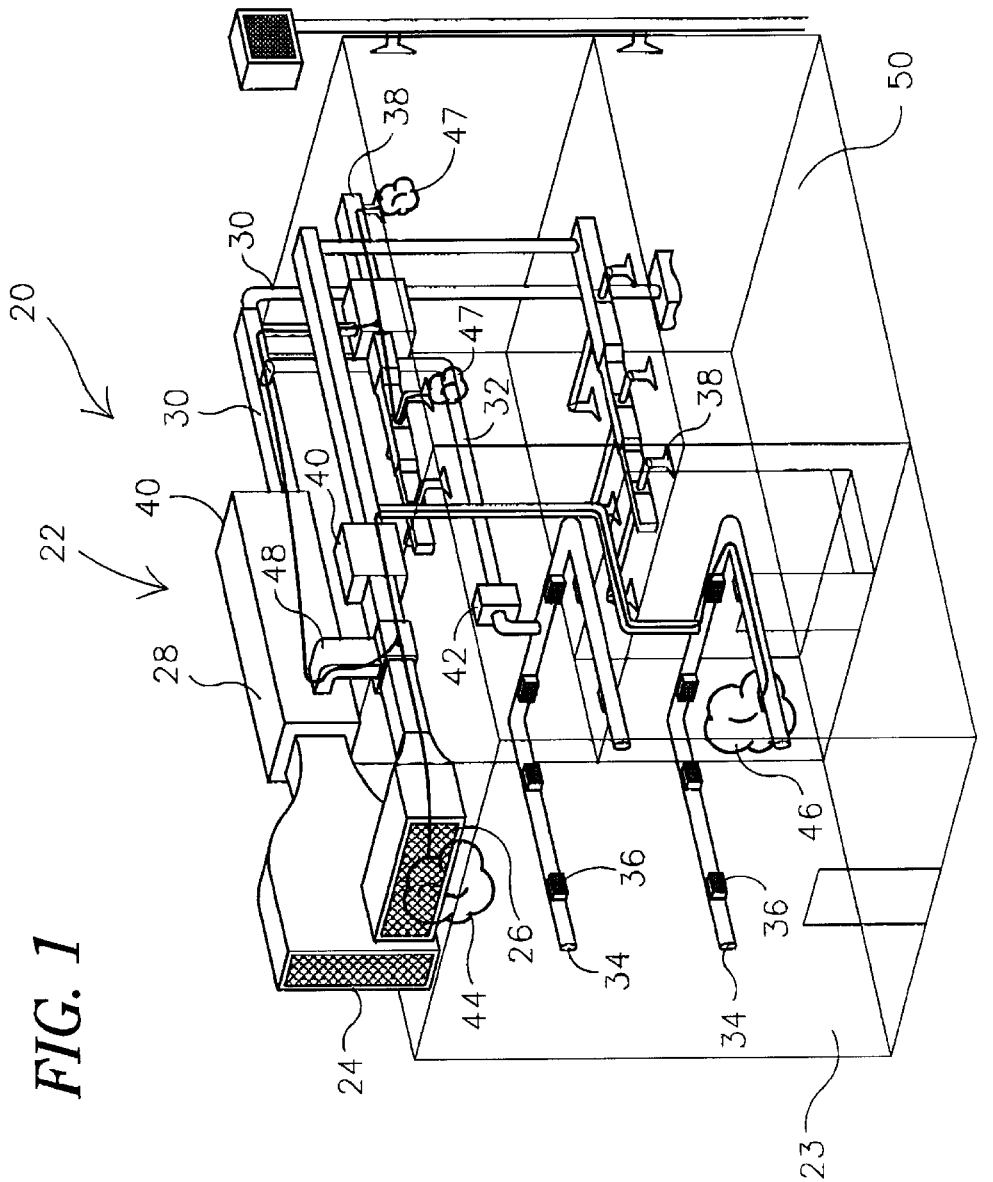
FIG. 1 is a highly diagrammatic, perspective, cutaway view of a conventional building HVAC system shown delivering a harmful agent from a public area return air duct to private areas in the building interior.
Figure 2:
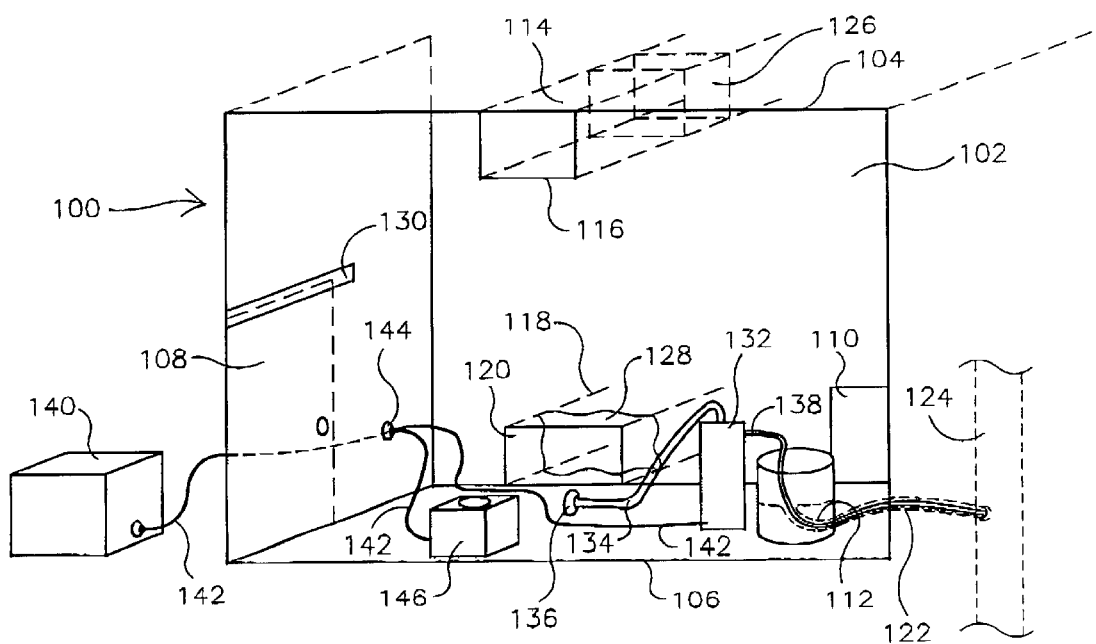
FIG. 2 is a highly diagrammatic, perspective, cutaway view of a sealed room in a building having an oxygen generator, a carbon dioxide scrubber, an external power source, blocked air vents, and an oxygen generator exhaust tube.

The nature of the problem to be dealt with can be understood by referencing FIG. 1. FIG. 1 illustrates a building 20 including a public atrium area 23 and having a conventional building heating, ventilating, and air conditioning (HVAC) system 22 not having any duct isolation equipment in place. HVAC system 22 is illustrated transporting harmful agent 46 through return air ducts 34 and dispersing it as externally released cloud 44. Air intake 24 and exhaust 26 are connected to a series of ducts including large, usually rectangular chambers or ducts such as chamber 28, and intermediate sized, usually rectangular, ducts 30. Intermediate ducts 30 split off into a series of smaller, often circular, ducts 32, which feed a series of room diffusers 38. Return air vents 36 and return air ducts 34 return air either to be expelled outside the building or be mixed with fresh air intake. Heating, cooling, humidification, and dehumidification functions are often performed in large chambers such as chamber 28, and in more local intermediate sized chambers 40 and 42. Mixing and/or recirculation can be performed by a return air duct 48.

FIG. 1 illustrates an internally released harmful agent cloud 46 dispersed in public atrium 23 near return air vents 36. Harmful agent 46 has been transported through return air ducts 34 and dispersed as externally released cloud 44. Return air ducts 34 are also connected through return air duct 48, into intake chamber 28, and may internally release harmful agent cloud 47 through diffusers 38. As illustrated, the harmful agent is delivered from a public portion of the building to the private areas of the building by the HVAC system and to the exterior near the building as well. A room 50 within the building is illustrated, as a possible candidate for conversion to a safe haven for use during a chemical or biological attack.

Referring now to FIG. 2, a room 100 is illustrated, after conversion to a safe haven for shelter from a harmful agent attack such as a chemical or biological attack. The present invention includes buildings having safe haven rooms that were initially built to serve that purpose and were built at the same time as the building or were added through extensive room addition and/or renovation. The present invention also includes buildings having a room renovated after moderate or minor construction to serve as a safe haven. Finally, the present invention includes methods and kits for rapidly adapting a room in a building into a safe haven. Room 100 serves to illustrate the features which can be present in specially built rooms, renovated rooms, and hastily adapted rooms.

Room 100 includes walls 102, a ceiling 104, a floor 106, and a door 108. Room 100 is also shown having a toilet 110, the significance of which is later described. Room 100 is supplied ventilation air by a supply duct 114 through a supply grill 116. The room normally has room air removed from the room by a return duct 118 through a return vent 120. While some embodiments have rooms not connected to building HVAC ducts, in a preferred embodiment, the room is connected to the building HVAC system and later sealed off from that system.

A room according to the present invention is preferably sealed off from the surrounding building air as much as is possible once use as a safe haven is desired. In specially built and retrofitted rooms this is possible using mechanically closeable and sealable ducts and vents. Typical duct air valves or dampers can be used with additional flexible edges and by using custom sized inflatable gas bladders, sized to fill the particular geometry of a given air duct. Additionally, closeable airtight vent closure devices can be installed near existing air vents. In rapidly adapted rooms, the sealing can be accomplished using a kit which can include inflatable gas bladders as described in copending U.S. patent application Ser. No. 09/281,738, filed Mar. 3, 1999, now U.S. Pat. No. 6,217,441, entitled METHOD AND APPARATUS FOR SEALING BUILDING DUCTWORK DURING CHEMICAL OR BIOLOGICAL ATTACK, herein incorporated by reference. The use of such a kit is illustrated in FIG. 2 having an inflated gas bladder 126 inserted well into duct 114 through vent 116. Another embodiment described in the referenced patent application is illustrated in a cured foam block 128 occluding vent 118. Another means for sealing the room is illustrated in a sealing tape 130 used to seal door 108. A tape such as duct tape can be used to seal around doorjambs as well as sealing room supply and return vents.

In use, the sealing devices can be activated when a harmful agent attack is detected, either automatically or manually. In specially built or retrofitted rooms, wall controls are preferably in place well prior to any attack. In these embodiments, the duct sealing devices can be quickly actuated and signals sent to central HVAC controls to shut off building air blowers. In the rapidly adapted room embodiment, room vents can be removed and foam and/or inflatable bladders inserted into ducts entering the room. A canister of a rapidly curing polymeric foam can be activated and inserted into a duct to seal the duct, even in the face of incoming supply air, particularly when the vent has also been covered with sealing tape. Sealing tape, such as duct tape, can be used either alone or in combination with other devices to seal vent openings into rooms. In one method for rapidly adapting a room, a vent grill is removed, a bladder inserted well into the duct and inflated, substantially if not totally occluding the duct. The bladder, if even partially successful, will substantially reduce airflow to the room and can be followed by a can of expanding, rapidly curing foam inserted into the duct. The foam can be followed by the installation of an airtight gasket over the vent opening into the room which can be held in place by the existing vent grill.

It is estimated that a 10 by 12 foot room contains sufficient oxygen to sustain one human being for about six hours. With additional people present and more safe haven time required, an oxygen supply is needed. An oxygen supply device is generally indicated by an oxygen supply 132, having a supply tube 134 and an optional face mask 136. Face mask 136 can be used to deliver oxygen directly to a human inhabitant where trying to supply the entire room is contraindicated.

Several oxygen sources are within the scope of the invention. In one embodiment, an oxygen tank containing compressed oxygen is used as the source to supply oxygen to the room. In another embodiment, the oxygen is supplied by chemically produced oxygen using a reaction similar to that used to supply oxygen to air plane passenger face masks, a technology well known to those skilled in the art. One source of oxygen is an oxygen-generating candle which produces oxygen upon ignition and decomposition of the candle. One such candle includes an oxygen source such as sodium chlorate, a metal powder fuel such as manganese, and an additive to suppress residual chlorine such as calcium hydroxide. See for example, U.S. Pat. No. 5,338,516, herein incorporated by reference.

In one embodiment, the oxygen is generated by adding a chemical compound to water, where the resulting reaction generates oxygen. The chemical reaction often is catalyzed by addition of a second compound. Examples of one such oxygen generator may be found in U.S. Pat. No. 4,508,700, herein incorporated by reference. Water-based oxygen generators are well known to those skilled in the art and are sold by companies such as Hoshiko Medical Laboratories, Inc., Kamoto, Japan and Dorcas Co., Ltd., Korea. Some water-based chemical generators have the advantage of not requiring external power and can have the rate of oxygen generation varied by varying the amount of catalyst present. Chemicals used in water-based chemical generators can include an addition compound of sodium carbonate and hydrogen peroxide. The catalyst can include manganese dioxide powder.

Other oxygen sources may also be suitable for the present invention, such as pressure swing absorption units (PSAs). PSA units do not generate oxygen, but preferentially separate the oxygen from nitrogen in the air. For this reason, the use of PSA in a closed system can present problems, making their use a less preferred embodiment. These problems can be handled by locating the PSA unit out of the room, but this requires the use of filtering the outside air against incoming harmful agents. In PSA units having sufficient filtering, the oxygen can be supplied using PSA from outside air, with the oxygen feed into the room. The PSA unit requires power to operate, which may present a problem when there is the possibility of power loss.

Another type of oxygen generator suitable for use in the present invention is an electrolytic generator, using water as the oxygen source. Electrolytic generators also require power to operate. In electrolytic generators, electricity is used to electrolytically separate water into oxygen and hydrogen. As hydrogen gas is highly explosive, it must be removed from the closed system atmosphere. This can be problematic when the room has been sealed. One method for removing the hydrogen gas includes absorbing the gas on a metal hydride. Examples of metal hydrides include nickel-mischmetal-calcium alloys. See for example U.S. Pat. Nos. 4,096,639 and 4,152,145, herein incorporated by reference. One method for removal of hydrogen gas includes venting the gas though a water trap 112 which can lead through a plumbing drain 122 to a stack 124. A vent tube 138 from oxygen source 132 can be snaked through water trap 112 and into stack 124. The hydrogen gas can thus be vented into the waste stack. As hydrogen gas is lighter than air. It will rise through the stack and out of the building. Water traps are commonly present in sinks, toilets, bathtubs, and shower stalls.

Yet another source of oxygen includes solid-state converters that can convert carbon dioxide into oxygen and carbon monoxide. Again, these converters may require venting and require a makeup source of oxygen to replenish the oxygen lost to the stack. Solid-state converters require electrical power which can present an unwanted requirement. Examples of solid-state converters include solid oxide electrolysis cells, for example, cells containing Yttria Stabilized Zirconia. Oxygen sources requiring power can be powered by sources such as batteries or by generators external to the room. A generator or electrical source 140 is illustrated coupled to oxygen source 132 through power lines 142 inserted through a sealed hole 144 in wall 102. In use, such power lines can be run under the door if sufficiently flat followed by sealing. A hole such as hole 144 can be rapidly formed in wall 102 in rapidly adapted room embodiments of the invention. Specially built rooms or converted rooms can have one-way exhaust tubes pre-built into the room.

While a sealed 10 by 12 foot room may contain sufficient oxygen to sustain one human for several hours, the carbon dioxide buildup will require other measures before the oxygen depletion. The present invention includes a scrubber 146 which can be used to scrub carbon dioxide from the room to maintain the carbon dioxide concentration below a certain level. Carbon dioxide scrubbing compounds are well known and can include such chemicals as caustic alkali and soda lime. In some embodiments, the scrubber is assisted by a fan and can be powered by either internal or external sources, such as by power line 142. The oxygen lost to the scrubber as carbon dioxide is preferably replaced by gaseous oxygen generated by chemical sources or supplied by compressed gaseous oxygen, such that the oxygen level in the room does not drop below safe limits.

In one embodiment of the invention, an air revitalization compound is used which both removes carbon dioxide and generates oxygen. Room air can be revitalized by passing the air through the material. Potassium superperoxide is an example of one such air revitalization compound. Another air revitalization compound is described in U.S. Pat. No. 4,238,464, herein incorporated by reference.

In all oxygen sources and carbon dioxide removal devices used in the present invention, selection of particular devices will include factoring in power availability and the suitability for closed systems. In particular, those skilled in the art will recognize the need to prevent the release of unwanted byproducts such as harmful gases or excess heat into the closed room. The selection of which embodiment of the present invention to use will vary from application to application.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for providing a human life sustaining atmosphere in a room of a building during a harmful agent attack, the room being controlled by an air-moving system that is wholly removed from the room through one or more ventilation ducts, the method comprising the steps of:

providing means for removing gaseous carbon dioxide from air;

providing means for generating gaseous oxygen;

providing means for sealing said room from said one or more ventilation ducts;

sealing said room from said one or more ventilation ducts using said sealing means;

removing some of said carbon dioxide from said room air using said carbon dioxide removing means; and generating oxygen using said oxygen generating means.

2. A method for providing a human life sustaining atmosphere in a room of a building during a harmful agent attack, the room being controlled by an air-moving system that is wholly removed from the room through one or more ventilation ducts, the method comprising the steps of:

providing a carbon dioxide scrubber;

providing a gaseous oxygen source;

providing sealing devices for sealing said room from said one or more ventilation ducts;

sealing said room from said one or more ventilation ducts using said sealing devices;

removing some of said carbon dioxide from said room air using said carbon dioxide scrubber; and supplying oxygen to said room using said oxygen source.

3. A method as recited in claim 2, wherein said oxygen source is an oxygen generator and said oxygen supplying step includes generating said oxygen.

4. A method as recited in claim 3, wherein said oxygen generator is a chemical oxygen generator.

5. A method as recited in claim 2, wherein said oxygen generator is an electrical oxygen generator and said oxygen supplying step includes generating said oxygen using electrolysis of water.

6. A method as recited in claim 5, wherein said electrolysis produces a hydrogen gas, further comprising providing a hydrogen adsorption device for adsorbing said hydrogen gas and adsorbing said hydrogen gas using said adsorption device.

7. A method as recited in claim 6, wherein said hydrogen absorption device includes a metal hydride and said hydrogen gas absorption step includes passing said hydrogen gas over said metal hydride.

8. A method as recited in claim 5, further comprising providing an exhaust conduit from said room and venting hydrogen gas produced by said electrolysis from said room.

9. A method as recited in claim 8, wherein said exhaust conduit is a tube inserted into a plumbing stack from said room and said venting step includes venting said hydrogen gas into said plumbing stack.

10. A method as recited in claim 9, wherein said plumbing stack is separated from said room by a water trap and said exhaust conduit extends from said room through said water trap and into said stack, wherein said venting step includes venting said hydrogen out of said room through said water trap.

11. A method as recited in claim 10, wherein said water trap is located in a plumbing fixture selected from the group consisting of sinks, bathtubs, shower stalls, and toilets, and said venting step includes venting said hydrogen through said plumbing fixture.

12. A method as recited in claim 5, wherein said electrical oxygen generator is supplied with electricity from an electrical source external to said room.

13. A method as recited in claim 12, wherein said electrical generator is driven by an internal combustion engine and said electricity is supplied through a cable fed into said room.

14. A method as recited in claim 12, wherein said generator is a fuel cell and said electricity is supplied through a cable fed into said room.

15. A method as recited in claim 2, wherein said sealing step includes sealing air supply ducts and air return ducts.

16. A method as recited in claim 2, wherein said sealing step includes inflating gas-filled bladders in air ducts coupled to said room.

17. A method as recited in claim 2, further comprising providing at least one personal supply tube for coupling to said oxygen source, said personal supply tube having at least two opposed ends, wherein said oxygen supplying step includes coupling a first end of said oxygen supply tube to said oxygen source and placing a second end of said oxygen supply tube near a human face.

18. A method for providing a human life sustaining atmosphere in a room of a building during a harmful agent attack, the room being controlled by a climate control system that is wholly removed from the room through one or more ventilation ducts, the method comprising the steps of:

provided means for removing gaseous carbon dioxide from air;

providing means for generating gaseous oxygen;

providing means for sealing said room from said one or more ventilation ducts;

sealing said room from said one or more ventilation ducts using said sealing means;

removing some of said carbon dioxide from said room air using said carbon dioxide removing means; and generating oxygen using said oxygen generating means.

* * * * *